UNITED STATES PATENT OFFICE.

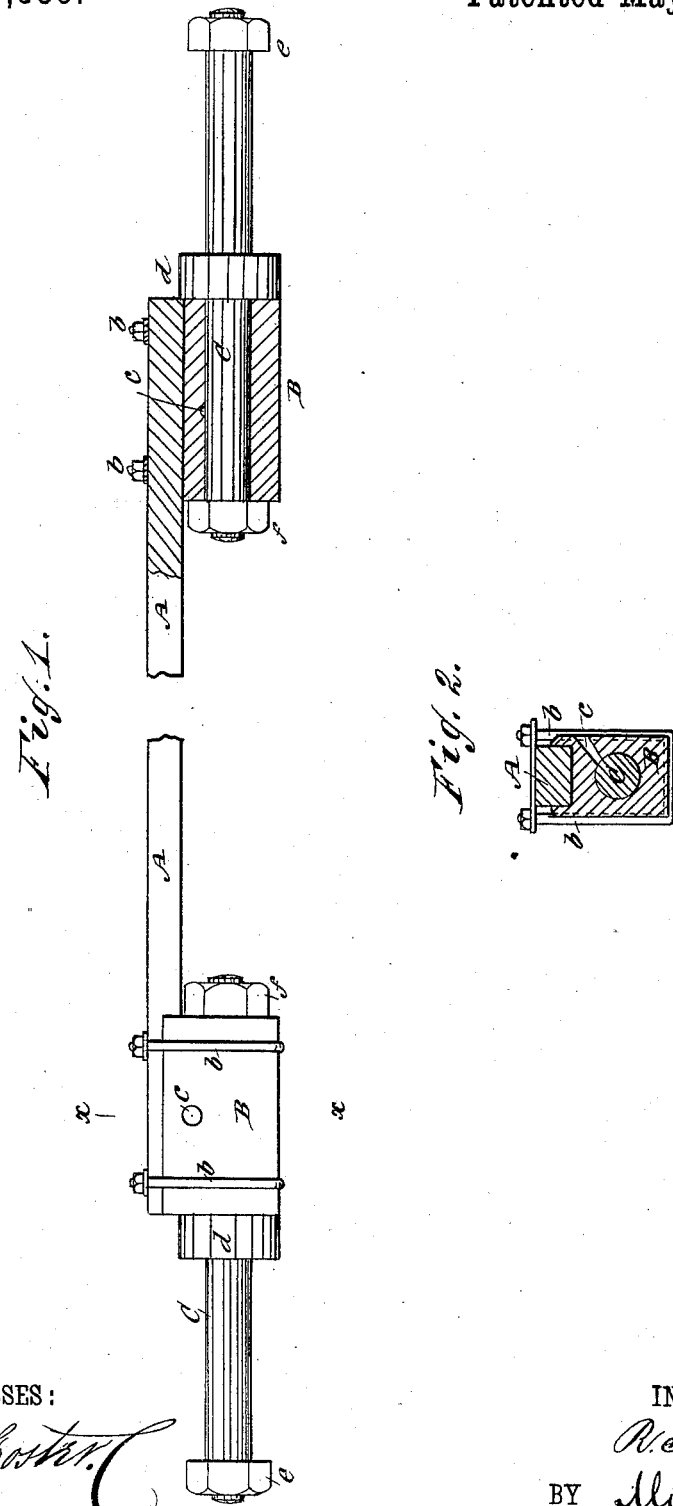

ROBERT F. IVEY, OF CUTHBERT, GEORGIA.

VEHICLE-AXLE.

SPECIFICATION forming part of Letters Patent No. 257,335, dated May 2, 1882.

Application filed January 28, 1882. (No model.)

*To all whom it may concern:*

Be it known that I, ROBERT F. IVEY, of Cuthbert, in the county of Randolph and State of Georgia, have invented a new and useful Improvement in Axles and their Boxes for Wagons and other Vehicles, of which the following is a full, clear, and exact description.

Reference is to be had to the accompanying drawings, forming part of this specification, in which similar letters of reference indicate corresponding parts in both the figures.

Figure 1 represents a broken and partly sectional longitudinal view of an axle-tree with attached boxes and duplicate axles or spindles fitted to said boxes. Fig. 2 is a transverse vertical section on the line $x\ x$ of Fig. 1.

This invention, which is applicable to buggies, wagons, and other wheeled vehicles, consists in a combination, with the axle-tree, of double spindles or axles—that is, a separate spindle at each end of the axle-tree for each wheel of a pair of wheels, said spindles, which have the wheels fast on them, being fitted to turn in boxes which are adjustable on and detachable from the axle-tree, and which are made self-oiling, and the spindles made reversible, when required, within their boxes, whereby numerous advantages are obtained, as hereinafter described.

A indicates an iron axle-tree; but the invention is equally applicable to a wooden one. Secured in an adjustable and detachable manner, by straps $b\ b$ or otherwise, to the two ends of the axle-tree, on its under side, are boxes B B, of metal, glass, or other suitable material. These boxes, which may or may not be flanged to receive a portion of the sides of the axle-tree within them, are made self-oiling by means of inclined apertures $c$, leading from their sides to their centers or bearings.

Fitted so as to turn independently in these boxes are separate spindles C C, of a little more than double the length of the boxes, and of uniform size or diameter throughout, excepting at their center, which is formed with a collar, $d$, and their ends, which are reduced to receive nuts $e\ f$. The outer or overhanging portions of these spindles have the wheels secured fast or driven on them, and the nuts $e\ e$ serve to keep the wheels from working off, while the nuts $f\ f$ of the opposite ends of the spindles, combined with the collars $d\ d$, hold the spindles to their places in the boxes.

The double or separate spindles C C, arranged as described, provide for less strain on the wheels by reducing fulcrum or distance apart of their bearings as compared with the usual arrangement of fitting the wheels to turn upon the ends of the axle or axle-tree. The wheels are stronger by not requiring to be fitted with boxes. The spindles C C, by revolving in their boxes B B, preserve their rotundity and will not wear flat, which increases friction and draft. The wheels do not require to be removed for the purpose of greasing, but the boxes B B are always accessible and self-oiling. Said boxes, too, can readily be detached when required to be relined, and the spindles C C, when constructed as described, can each of them be reversed end for end, as wear of them in their boxes requires—that is to say, the portions of the spindles which carry the wheels can be inserted in the boxes, and the portions of them which formerly turned in the boxes can have the wheels secured on them, thus virtually converting the old spindles into new ones.

The independent spindles C C are here shown of uniform diameter on either side of their shoulder $d$; but it is evident that they may be of reversely reducing tapers on opposite sides of said shoulder; also, that the straps $b\ b$, used for holding the boxes to the axle, may be inverted by passing them over the tops of the axles and through flanges attached to the bottoms of the boxes, where they may be secured by nuts.

Having thus fully described my invention, I claim as new and desire to secure by Letters Patent—

The combination, with the boxes B B, secured under each end of axle A, of the independent spindles C C, each having a median collar, $d$, formed of corresponding size on each side of said collar, provided with a nut at each end, one side rotating in the box and the other made fast to the wheels, whereby the spindles may be reversed to equalize wear, as described, and the wheels rigidly clamped to the spindles to turn with them, as set forth.

ROBERT FLORIZELL IVEY.

Witnesses:
GEO. MCDONALD,
J. MCK. GUNN.